United States Patent
Román et al.

(12)

(10) Patent No.: US 8,590,777 B1
(45) Date of Patent: Nov. 26, 2013

(54) SPACE EQUIPMENT RECOGNITION AND CONTROL USING HANDHELD DEVICES

(76) Inventors: Kendyl A. Román, Sunnyvale, CA (US); John Livacich, Sunnyvale, CA (US)

( * ) Notice: Subject to any disclaimer, the term of this patent is extended or adjusted under 35 U.S.C. 154(b) by 0 days.

(21) Appl. No.: 13/525,274

(22) Filed: Jun. 16, 2012

(51) Int. Cl.
*G06F 17/00* (2006.01)

(52) U.S. Cl.
USPC .......................................... 235/375; 235/487

(58) Field of Classification Search
USPC ............. 235/375, 487, 462.45, 472.01, 462.1
See application file for complete search history.

(56) References Cited

U.S. PATENT DOCUMENTS

2006/0020774 A1* 1/2006 Ramos et al. ................. 712/226

* cited by examiner

Primary Examiner — Edwyn Labaze

(57) ABSTRACT

A system, handheld devices, and methods for space equipment tracking and control. The system tracks and controls items, people and their interactions. The handheld mobile wireless device provides item specific information, instruction, and supervision. A plurality of handheld devices is configured to be used by different people, and communicate with a central database. A handheld device comprises a camera for scanning an image of an item of space equipment, a display for displaying information, and a wireless network connection to the database for sending and receiving data. The system recognizes the item of space equipment and identifies a person. The database includes information regarding people and their roles, permissions, and authorized or assigned tasks; space equipment and tools; item specific instructions; and the handheld devices. An observer, or the system, can monitor the performance of the tasks, and provide corrective feedback.

20 Claims, 8 Drawing Sheets

PRIOR ART

SPACE EQUIPMENT RECOGNITION AND CONTROL USING HANDHELD DEVICES

BACKGROUND

1. Field of Invention

The present invention relates to object recognition and control, in particular the invention relates to space equipment recognition and control including mobile wireless devices for use by a space exploration organization.

2. Description of Prior Art

Various space exploration organizations develop space equipment. Initially only NASA and the Russian Soviet Space programs had the resources to develop space flight and the require equipment. More recently other space exploration or space launch companies exist. For example, Space Exploration Technologies Corporation (SpaceX) was founded in 2002, Alliant Techsystems Inc (ATK Aerospace Systems) develops space launch equipment, and Orbital Sciences Corporation (OSC) develops satellites and launch systems.

Various attempts have been made to label objects with labels that can be read automatically by a computing machine. Barcodes have proven to be an effective scheme for achieving these purposes. Originally, linear or one-dimensional barcodes such as the Universal Product Code (UPC) were used. The UPC was the first commercially successful model and enjoyed widespread universal use.

Later a two-dimensional or matrix code was developed. These are similar to one-dimensional codes, but represent more data per unit area and traditionally utilize square pixels. While the UPC represents a serial number, matrix codes can represent text, URLs, or other data. The Quick Response Code (QR Code or QRC) is one of the most popular types of two-dimensional codes and is often used with smart phones.

More recently, a third-generation barcode called the High Capacity Color Barcode (HCCB) was developed. This two-dimensional barcode uses multi-colored triangles for an increase in data density, but still represents the same types of data.

Bar code readers are typically connected to computer systems and databases to keep track of sales or inventory.

These conventional methods have many drawbacks and limitations including the inability to identify individuals in various disciplines and roles and correlate relationships, tasks, permissions, etc. with other objects and/or individuals. In addition, these methods lack the ability to provide and present training, instructional and other information in various forms for maintenance and other purposes.

There is a need for mobile wireless handheld devices to be able to recognize various items of space equipment and people and to provide for training, instruction, tracking, monitoring, and observation, which is authorized, and item specific. Further there is a need to be able to confirm that maintenance or use procedures are performed properly while they are being performed.

SUMMARY OF THE INVENTION

It is an objective of the present invention to provide a means and method of identifying items of space equipment that include and go beyond those currently identifiable by conventional labels and go beyond existing tracking systems. Although traditional coded labels have proven to be an effective scheme for achieving item identification, they by themselves fall short of being able to achieve a more universal means and method of space equipment recognition, training, instruction, tracking, monitoring, observation, and control.

Handheld mobile wireless devices are used with space equipment and individuals to provide up-to-date pertinent information using methods such as on screen instructions, checklists, videos, pictures, diagrams, etc. or any combination thereof. Items and people are identified by scanning a label attached to the item or person, or by use of object recognition, facial recognition, or other biological recognition, such as iris scan, fingerprint scan, or other recognition known in the art. The system tracks and controls items, people, and their interactions. The handheld mobile wireless device provides item specific information, instruction, and supervision.

A system aspect of the invention comprises a plurality of handheld devices used by different people, and a database in communication with the handheld devices.

A handheld device comprises a camera for scanning an image of an item of space equipment, a display for displaying information, and a wireless network connection to the database for sending and receiving data.

The system recognizes the item of space equipment by interpreting the image. In some embodiments, a coded label, e.g. a UPC or QR code, is interpreted. The system also identifies a person. The person may be identified by being associated with the handheld device; by scanning a scan label, such as an ID badge, ID card, or tattoo; or by scanning a face, a fingerprint, an iris, or other biometric.

The database includes information regarding people and their roles, permissions, and authorized or assigned tasks; space equipment and tools; item specific instructions; and the handheld devices. The database also records information regarding the interaction between the space equipment and the people.

The roles include maintenance, use, and observation, and may vary based on the item of space equipment.

The item specific instructions include documents, checklists, pictures, audio, and video.

When the handheld device scans an item of space equipment, the item is recognized, the person and their role are identified, and if the person is authorized the handheld device provides item specific instructions.

In some situations, an observer is notified when use, or maintenance, is started by another person who is a user, or a maintainer, respectively.

An observer, or in some embodiments, the automated system, can monitor the proper performance of the tasks, and provide corrective feedback during the performance.

Method aspects of the invention include capturing an image with the camera of the handheld device, interpreting the image, determining an item of space equipment, determining a person, and if the person is authorized determining a role of the person.

A method of performing maintenance includes identifying a current part and any associated tools, providing item specific instructions for the current maintenance task, confirm completion of the task, and recording completion of the task, and repeating for each maintenance task.

A method of performing use includes identifying tools, if any, providing item specific instructions for the current use task, confirm completion of the use, and recording information regarding the use, and repeating for each use task.

A method of performing observation includes providing item specific instructions if required, and recording information regarding the start and finish of the observation, and repeating for each observation task.

OBJECTS AND ADVANTAGES

Accordingly, the present invention includes the following advantages:

1. To provide a means and method of space equipment recognition and control.
2. To provide a means and method of space equipment recognition and control that is role based.
3. To provide a means and method of space equipment recognition and control that is used for verification and ratification.
4. To provide a means and method of space equipment recognition and control that is used for assembly instructions.
5. To provide a means and method of space equipment recognition and control that is used for maintenance notification, instructions, and tracking.
6. To provide a means and method of space equipment recognition and control that is used to log maintenance and events.
7. To provide a means and method of space equipment recognition and control that is used to track the events in life of an item of space equipment.
8. To provide a means and method of space equipment recognition and control in an extraterrestrial environment.
9. To provide a means and method of object recognition and control for space equipment.

DRAWING FIGURES

In the drawings, closely related figures have the same number but different alphabetic suffixes.

REFERENCE NUMERALS IN DRAWINGS

| | |
|---|---|
| 100a-d | coded label |
| 101 | universal product code (UPC) |
| 102 | quick response (QR) code |
| 103 | high capacity color barcode (HCCB) |
| 120a-c | scan label |
| 200a-c | space equipment |
| 210a-c | handheld device |
| 211a-c | image data |
| 212a-c | outgoing database information |
| 213a-c | incoming database information |
| 220 | maintainer |
| 230 | user |
| 240 | observer |
| 250 | database |
| 300 | start |
| 301 | path |
| 302 | capture image |
| 303 | path |
| 304 | interpret image |
| 305 | path |
| 306 | determine object |
| 307 | path |
| 308 | determine person |
| 309 | path |
| 310 | is person authorized |

-continued

| | |
|---|---|
| 311 | path |
| 312 | determine role |
| 313 | path |
| 314 | no access |
| 315 | path |
| 316 | maintenance? |
| 317 | path |
| 318 | perform maintenance |
| 319 | path |
| 320 | use? |
| 321 | path |
| 322 | perform use |
| 323 | path |
| 324 | observe? |
| 325 | path |
| 326 | perform observation |
| 327 | path |
| 329 | path |
| 331 | path |
| 332 | identify part |
| 333 | path |
| 334 | identify tools |
| 335 | path |
| 336 | provide instruction |
| 337 | path |
| 338 | notify observer of start |
| 339 | path |
| 340 | confirm completion |
| 341 | path |
| 342 | record completion |
| 343 | path |
| 344 | notify observer of completion |
| 345 | path |
| 346 | more tasks? |
| 347 | path |
| 348 | exit |
| 349 | path |
| 350 | path |
| 351 | path |
| 352 | tools required? |
| 353 | path |
| 354 | identify tools |
| 355 | path |
| 356 | provide instruction |
| 357 | path |
| 358 | notify observer of start |
| 359 | path |
| 360 | confirm use |
| 361 | path |
| 362 | record use |
| 363 | path |
| 364 | notify observer of completion |
| 365 | path |
| 366 | more tasks? |
| 367 | path |
| 368 | exit |
| 369 | path |
| 370 | path |
| 371 | path |
| 372 | instruction needed? |
| 373 | path |
| 374 | provide instruction |
| 375 | path |
| 376 | record observation start |
| 377 | path |
| 378 | communicate with others |
| 379 | path |
| 380 | record observation finish |
| 381 | path |
| 382 | more tasks? |
| 383 | path |
| 384 | exit |
| 385 | path |
| 400 | roles |
| 402 | people |
| 404 | space equipment (tools) |
| 406 | tasks |
| 408 | task list |
| 410 | devices |
| 510a-b | tool |

-continued

| | |
|---|---|
| 520 | mounted camera |
| 540 | overhead camera |
| 552 | landing vehicle |
| 562 | orbiter |

DESCRIPTION OF THE INVENTION

Prior Art Coded Labels

Figure 1A:
FIG. 1A through FIG. 1C show prior art coded labels, such as bar codes and QR codes.
Figure 1B:
Figure 1C:
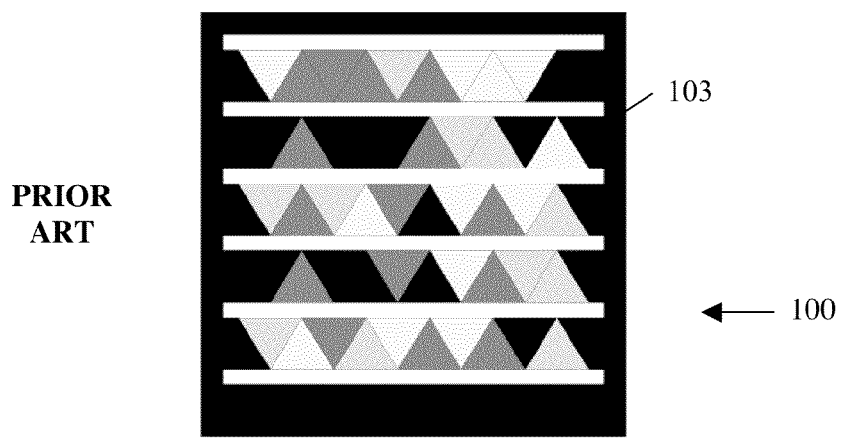

FIG. 1A through FIG. 1C show prior art coded labels 100.

FIG. 1A illustrates an example of a coded label 100 with a barcode, in particular universal product code (UPC) 101. A barcode or UPC typically represents a number. The UPC system allows each product to have a unique code making the system universal. However, individual products can only be identified with an additional label such a serial number barcode.

FIG. 1B illustrates an example of a coded label 100 with a quick response (QR) code 102. A QR code 102 has high data density. It can encode free form text and is typically used to encode a direct address of other information such as an URL.

FIG. 1C illustrates an example of a coded label 100 with a high capacity color barcode (HCCB) 103. A HCCB may also contain a direct address such as an URL.

Figure 2:
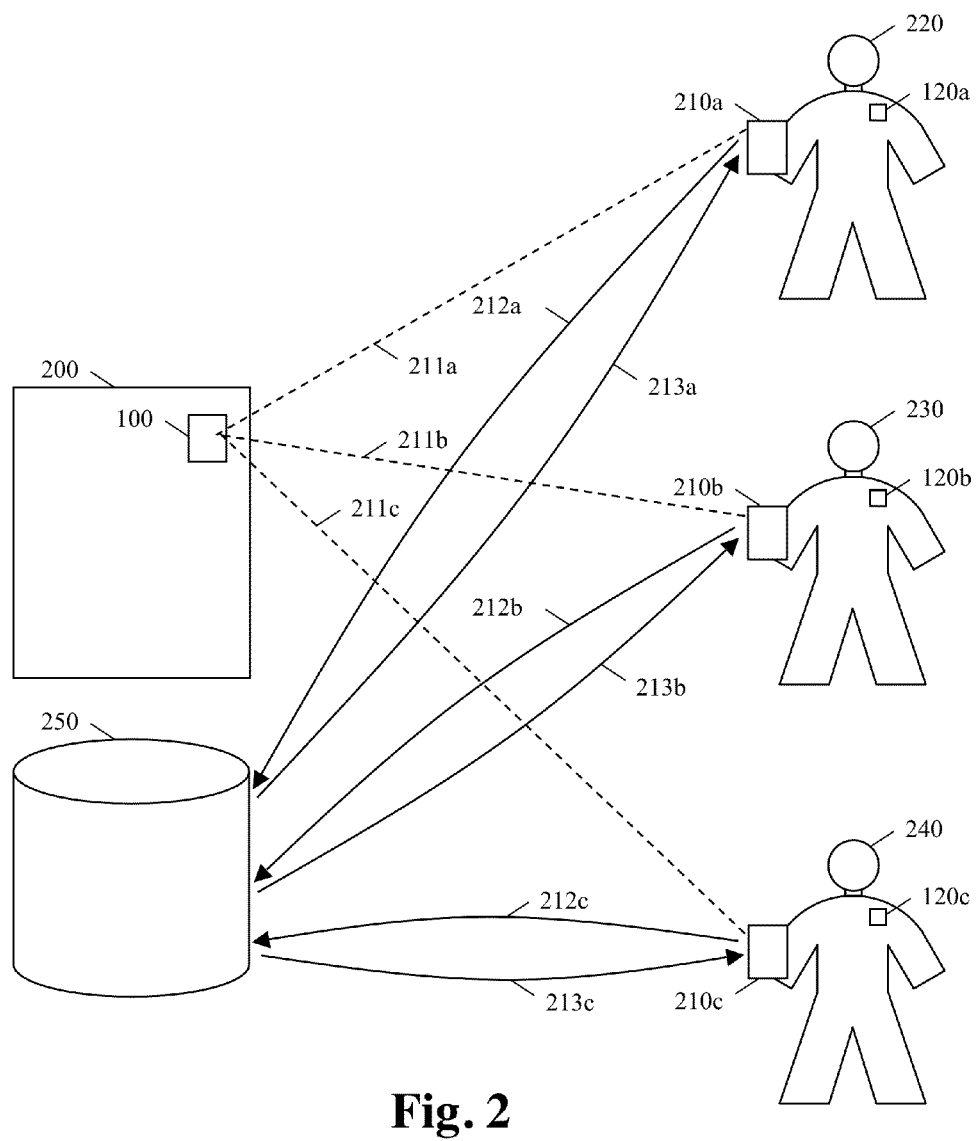
FIG. 2 illustrates the system with people with different roles and separate handheld devices communicating with the same database and server.

Handheld Devices Used for Space Equipment Recognition and Control and Instruction FIG. 2 illustrates a system with people with different roles and separate handheld devices communicating with the same database and server. Each person is shown with a handheld device 210. The handheld device 210 is preferably a mobile wireless device. The handheld device 210 includes a camera, which can scan an image of an item of space equipment 200. A coded label 100 on space equipment 200 is initially scanned as image data 211a-c by any of the handheld devices 210a-c, which is operated by a maintainer 220, a user 230, and/or an observer 240, respectively. The observer 240 can be a manager, supervisor, or team leader, etc. The handheld devices 210a-c each interacts with the same database 250 to send and receive information. Information sent to the database 250 is outgoing database information 212a-c respectively. For example, when maintainer 220 scans the coded label 100 on space equipment 200, the image data 211a is interpreted by the handheld device 210a and the decoded data is sent to the database 250 as outgoing database information 212a. The maintainer 220 may also be recognized, for example by scanning scan label 120a. Information sent from the database 250 to the handheld devices 210a-c is incoming database information 213a-c, respectively. Incoming database information 213 may be directed to the maintainer 220, the user 230, and/or the observer 240. The information in database 250 can include instructions, tools list and maintenance logs. The data in the database 250 may describe each person's role, authorization, security access or other information. For example, after receiving the decoded data from the handheld device 210a, incoming database information 213a sent to the maintainer 220 would include instructions and a list of tasks, which may be customized to the specific maintainer 220 (as identified e.g. by scan label 120a). The maintainer 220 may receive information about the parts on or in the identified space equipment 200. The maintainer 220 may also receive instructions on how to perform the maintenance and the tools necessary. The maintainer 220 may be shown a video series on the handheld device 210a showing each of the steps of the required maintenance. A local handheld device (e.g. 210a) may detect whether or not the proper steps were performed. The observer 240 may be in a remote location, and may receive information about the maintainer 220, or the user 230, information on progress updates, and visual data (pictures and/or video) to oversee the tasks being performed.

The communication paths for the outgoing database information 212a-c and the incoming database information 213a-c are preferably wireless, such as WiFi or 3G or 4G wireless network protocols.

The mobile wireless handheld devices 210a-c can communicate directly to each other as enabled by the database 250, or may communicate using the database 250 as a teleconferencing server.

In some embodiments, the observer 240 observes using conventional computer or video conferencing equipment, rather than using a handheld device 210c.

Exemplary Operation

FIG. 3A through FIG. 3D provide flowcharts for method aspects of an embodiment of the invention. Other embodiments may omit or add steps, or perform steps in different orders.

Figure 3A:
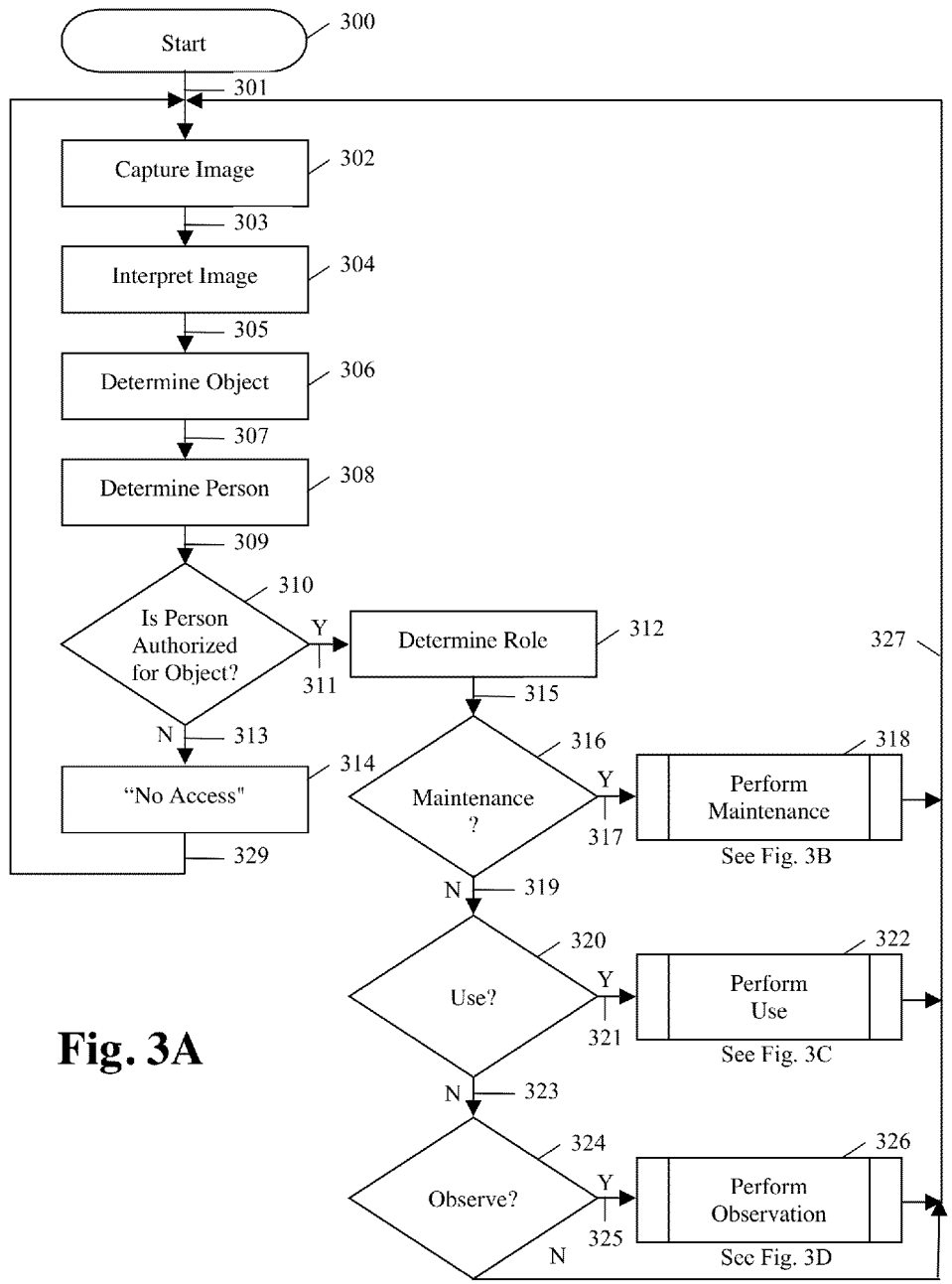
FIG. 3A through FIG. 3D illustrate flowcharts of showing the exemplary steps for the methods of the system.

FIG. 3A is a top-level flowchart. The process starts at step 300 and moves along path 301 to a capture image step 302 where the image is captured by a handheld device 210. The process moves along path 303 to an interpret image step 304 where the image is interpreted. The image may be interpreted by the handheld device 210 or by the database 250. Then the process moves along path 305 to a determine object step 306 where the space equipment is determined from data stored in the database based on the image data 211. Then the process moves along path 307 to a determine person step 308. The person may be determined based on a device code unique to the handheld device (e.g. 210a or 210b), by the scan label (e.g. 120a or 120b), or by a face, fingerprint, or iris scan. This checks the identity of the individual running the handheld device 210. The process then moves along path 309 to a decision 310 where it checks if the person is authorized for item of space equipment. If not, the process moves along path 313 to "No Access" step 314 where it will send a message stating "No Access" and moves along path 329 back to path 301. If yes, the process moves along path 311 to a determine role step 312 where the role will be determined for the person determined in step 308. Then the process decides which sub-process to perform based on the role: maintenance, use, or observation. First the process moves along path 315 to maintenance? decision 316 to decide if the role is maintenance. If yes, the process moves along path 317 to perform maintenance step 318 (see FIG. 3B) and then moves along path 327 back to path 301. If not, the process moves along path 319 to use? decision 320 to decide if the role is use. If yes, the process moves along path 321 to perform use step 322 (see FIG. 3C) and then moves along path 327 back to path 301. If not, the process moves along path 323 to observe? decision 324 to decide if the role is observe. If not the process moves along path 327 back to path 301. If yes, the process moves along path 325 to perform observation step 326 (see FIG. 3D) and then moves along path 327 back to path 301.

Figure 3B:
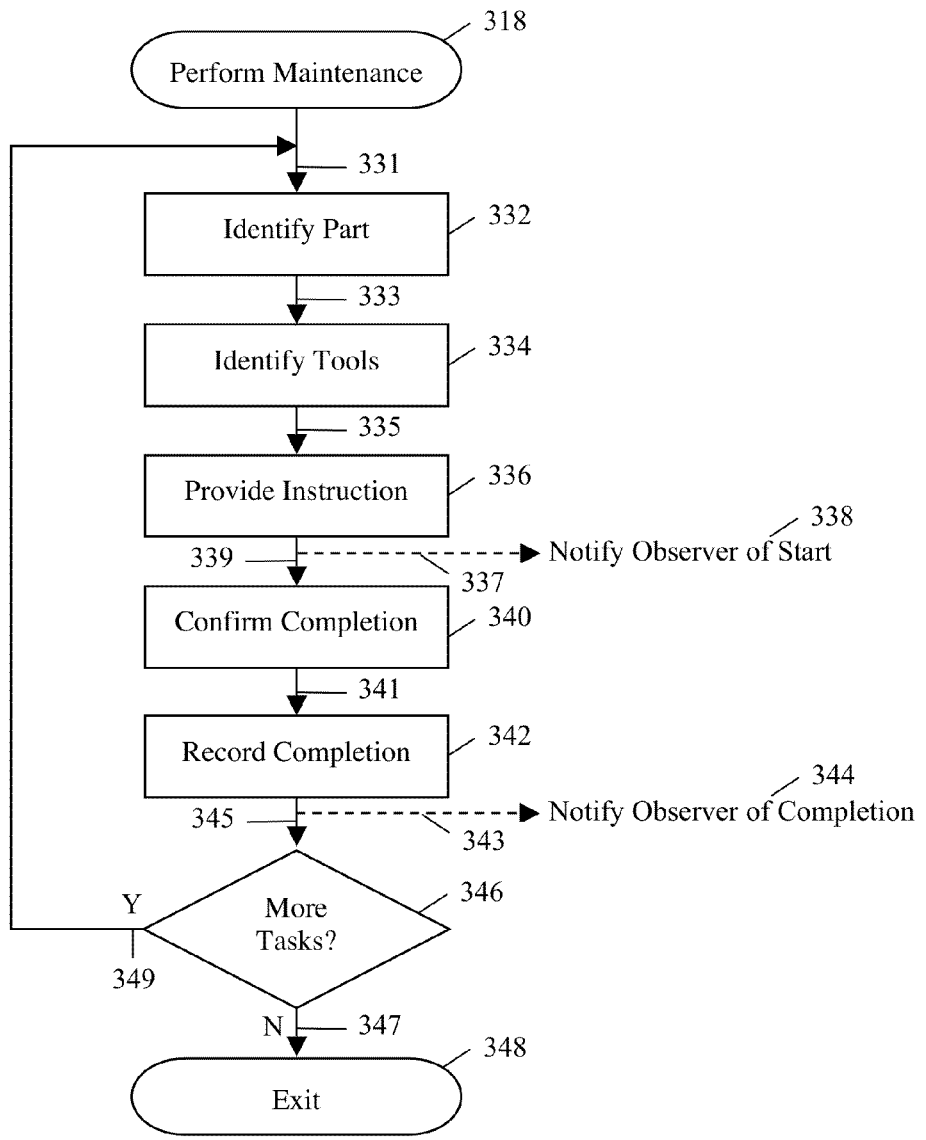
Figure 3C:
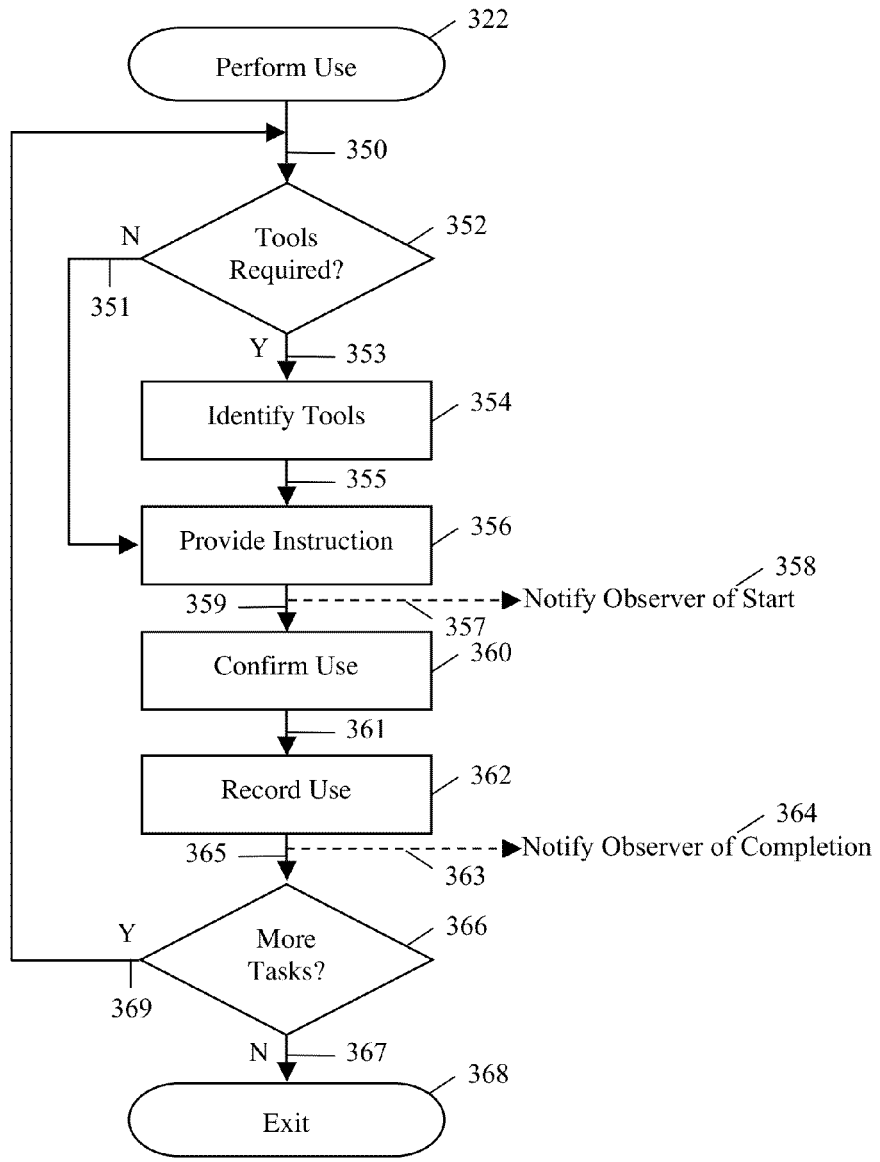

In some embodiments, the perform observation step 326 is triggered independently, for example, by the notify observer of the start of maintenance message 338 in FIG. 3B or by the notify observer of the start of use message 358 in FIG. 3C. In those embodiments, the observer 240 does not need to scan the item's label, but instead may be optionally identified by their handheld device 210c or by scanning their ID scan label 120c, and associated with the observer role by data stored in the database. In other embodiments the observer 240 is identified by the conventional computer or video conferencing equipment they are using or by their physical location.

FIG. 3B is a flowchart for the perform maintenance 318 process. The process begins along path 331 to an identify part step 332 where a maintenance part is determined. Next the process moves along path 333 to an identify tools step 334, where the tools associated with the current maintenance part are identified. The process moves along path 335 to a provide instruction step 336. Instructional information regarding the current maintenance part, use of tools, how the maintenance is performed is provided, for example, as incoming database information 213a from the database 250 to the handheld device 210a. The instructional information could include videos of the maintenance process. At event 337, a notify observer of the start of maintenance message 338 is sent. The handheld device 210c associated with the observer 240 is notified along communications path 213c. The observer can observe the maintenance procedure via pictures, audio, and/or video transmitted to the handheld device 210c (or in some embodiments, to conventional computing or video conferencing equipment). The information in message 338 is sufficient to automatically authorize and enable the observer 240 to observe the maintenance without requiring further actions by the observer 240. The observer 240 can watch what is happening and will subsequently wait for confirmation of the maintenance completion. When the maintenance is completed, the process moves along path 339 to the confirm completion step 340, the handheld device 210a will send completion information back to the database 250. The process will then move along path 341 to a record completion step 342 where the completion of the task is recorded in the database 250. The database 250 can log the time and date of the maintenance as well as logging the person who performed the maintenance, the tools used, how long it took, and so forth. At event 343, a notify observer of the completion of maintenance message 344 is sent. The observer 240 could verify that the maintenance was performed as required and can then turn attention to other matters. The optional verification could include sending a verification message to the database 250. Then the process moves along path 345 to more tasks? decision 346 to determine if there are more maintenance tasks. If so, the process moves along path 349 to path 331 to repeat the cycle. If not, the process moves along path 347 to exit 348.

FIG. 3C is a flowchart for the perform use 322 process. The process begins along path 350 to a tools required? decision 352. If so, the process moves along path 353 to an identify tools step 354 where tools are identified and continues along path 355. If not, the process moves along path 351 and skips step 354. At a provide instruction step 356, information regarding use, and tools if applicable, is provided to the handheld device 210b of the user 230. The instruction could include a checklist, pictures, audio, and/or video. At event 357, a notify observer of the start of use message 358 is sent. The handheld device 210c associated with the observer 240 is notified along communications path 213c. The observer 240 can observe the use via pictures, audio, and/or video transmitted to the handheld device 210c (or in some embodiments, to conventional computing or video conferencing equipment). The observer 240 may wait for notice of use completion. When use is completed, the process moves along path 359 to the confirm use step 360, the handheld device 210b will send use information back to the database 250. The process will then move along path 361 to a record use step 362. The database 250 can log the time and date of the use as well as logging the person who performed the use, the tools used, how long the space equipment was used, and so forth. At event 363, a notify the observer of the completion of use message 364 is sent. Then the process moves along path 365 to more tasks? decision 366 to determine if there are more use tasks. If so, the process moves along path 369 to path 350 to repeat the cycle. If not, the process moves along path 367 to exit 368.

Figure 3D:
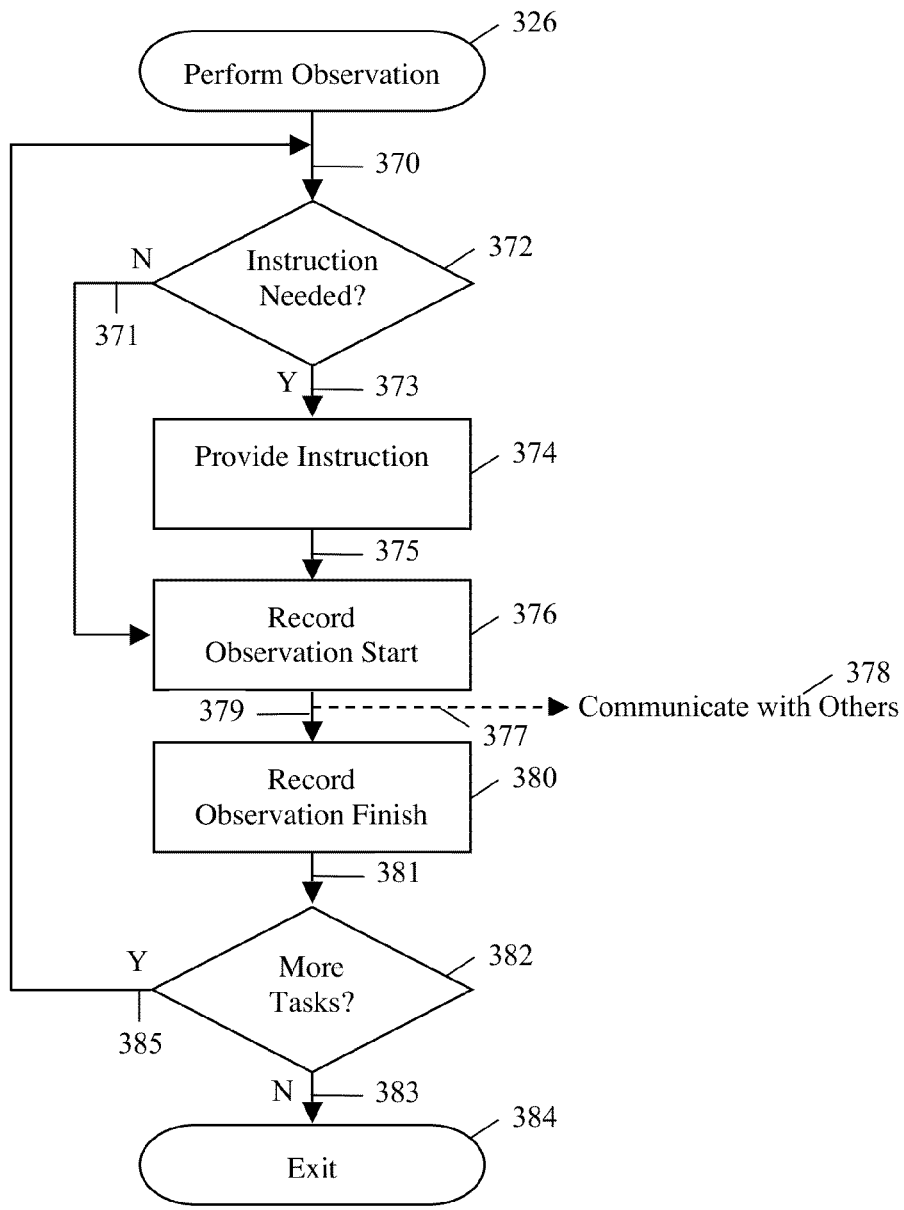

FIG. 3D is a flowchart for the perform observation 326 process. The process begins along path 370 to an instruction needed? decision 372. If so, the process moves along path 373 to a provide instruction step 374, where instruction regarding the observation is provided, and continues along path 375. If not, the process moves along path 371 and skips step 374. At the provide instruction step 374, information is provided to the handheld device 210c of the observer 240. The instruction could include a checklist, pictures, audio, and/or video. In record observation start step 376, it is noted that the observer 240 has started the observation. During the observations, at event 377, the observer 240 may communication with others, e.g. the maintainer 220 or the user 230. The communication with others 378 could be instructional, corrective or supportive information. The handheld device 210c associated with the observer 240 will send communication 378 to other handheld devices (e.g. 210a or 210b). When the observer 240 stops observing, the process moves along path 379 to the record observation finish step 380, the handheld device 210c will send observation information back to the database 250. The database 250 can log the time and date of the observation as well as logging the person who observed, how long the observation took, the types of communication that occurred during the observation, and so forth. Then the process moves along path 381 to more tasks? decision 382 to determine if there are more observation tasks. If so, the process moves along path 385 to path 370 to repeat the cycle. If not, the process moves along path 383 to exit 384.

Database

Figure 4:
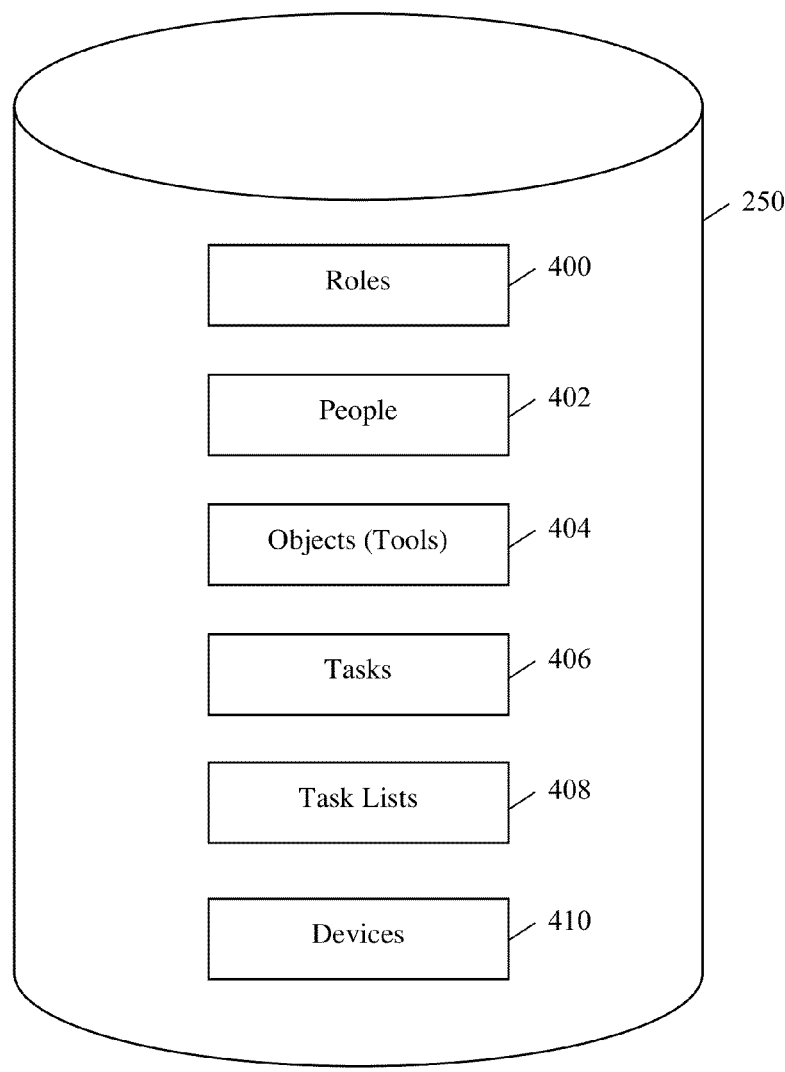
FIG. 4 illustrates the structure of the database.

FIG. 4 illustrates the types of information that the database 250 will hold and maintain. The database 250 can be any data repository including relational, hierarchical, etc. The data schema will support various entities including roles 400, people 402, space equipment (including tools) 404, tasks 406, task lists 408, and devices 410. The storage of this information on a single, central accessible database is valuable to proper communication and coordination.

The data regarding roles 400 include the roles of various people associated with various items of space equipment. For example, an individual may be a maintainer of a particular item, such a machine, but may be a user of another item, such a tool used to fix the machine. The individual may also be a supervisor for another maintainer and will be notified as an observer whenever the maintainer they supervise is performing maintenance. Thus the same individual may have the role of maintainer, user, and observer. These relationships are tracked in the Roles 400, People 402, and Objects (Space Equipment and Tools) 404 data tables.

Means for identifying people such as ID badges, fingerprints, face scans, or iris scans are stored in the People 402 data table. Relationships of people 402 to roles 400, objects 404, task lists 408, and devices 410 are also tracked in the database.

Item specific tasks 406 and instructions associated with those tasks are stored in the Tasks 406 portion of the database. Item specific instructions may include documents, checklists, pictures, audio, and/or video.

Exemplary Use

Figure 5:
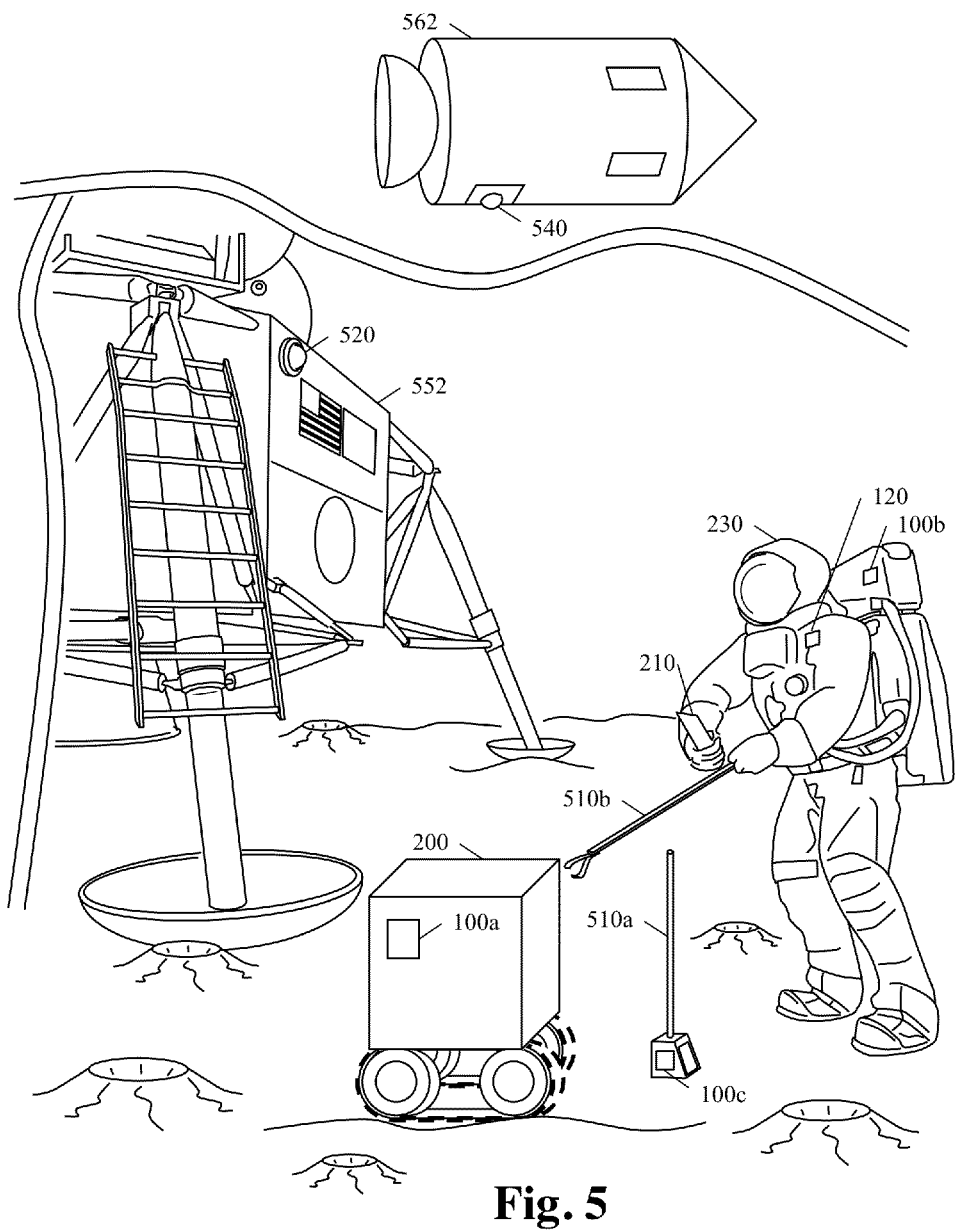
FIG. 5 illustrates an astronaut with a handheld device in an extraterrestrial environment and cameras for remote observation.

FIG. 5 shows how user 230, for example, an astronaut on Mars, can use a handheld device 210 and various communication methods. The user 230 identified by the scan label 120 can access information from the handheld device 210. A remote observer 240, for example, Mars mission control, can observe using various cameras, such as mounted camera 520 shown on a landing vehicle 552 or an overhead camera 540 shown on an orbiter 562. The handheld device 210 can identify space equipment 200 (shown as a exploration robot) by reading coded label 100*a* to review maintenance history, to determine what tasks are to be performed using the space equipment 200, and to get more information regarding the space equipment 200. The database 250 can assimilate this information and determine whether the user 230 will need tools such as scoop tool 510*a* or tong tool 510*b* for a particular use (or maintenance task). For example, the astronaut may be instructed to use the scoop tool 510*a* to collect a sample of Mars dust and then to place in an input port on the exploration robot from processing and analysis. At the same time, the system tracks that the specific user 230 is interacting with the space equipment 200. The system can notify one or more observers 240 who are required to observe or who may be interested and authorized to observe. The system may automatically observe. For example, if tool 510*a* is required, the system can notify the astronaut 230, provide instructional information, including video information to the astronaut 230 via the handheld device 210, and the monitor the use to ensure that it is performed properly.

If the use (or maintenance task) is not performed properly, the system, or an observer 240, can correct the situation while the astronaut 230 is in position and performing the task. Further, if there is a problem, additional instruction may be provided via pictures, audio, and/or video. Details of the use or maintenance, and optional observation, are stored in the database as part of the maintenance or use history and can be used to improve procedures, training, and safety.

If, during an extravehicular activity (EVA), the space suit identified by coded label 100*b* develops a problem, the mission control observers would: a) be provided confirmation based on the coded label 100*b* that the right space suit is being used, b) have access to the complete maintenance history of the space suit, c) have accurate information about the specific model of suit and parts and how to address the problem. They would also be able to identify similar problems that occurred during training and testing as well as people who were involved with the problems as users, maintainers, and observers. Those people could be quickly called to assist with the situation at hand. Once the problem is understood, maintenance tasks could be scheduled to resolve the problem that may potentially affect other space suits with similar parts.

In some embodiments, the mounted camera 520 can scan all of the coded labels 100 and scan labels 120 as well as recognize space equipment 200 and tools 510. Once a user 230 and the space equipment 200 are identified in proximity, the system could instruct the user 230 via the handheld device 210 to perform the procedure. The system could observe the entire interaction and provide instruction prior to each task as well as providing corrective feedback and instruction when the wrong actions or parts are observed. The system would also record information regarding the user 230, the space equipment 200, and the interactions.

ADVANTAGES

Role Based

The present invention can be used to assign roles to individuals associated with various items of space equipment or tasks.

Specific Media Rich Instructions

The present invention can be used to provide instructions regarding specific items of space equipment to specific individuals in a variety of mediums including documents, checklists, pictures, audio, and/or video.

Maintenance Notification and Instructions

The present invention can be used to provide maintenance notification and instructions regarding specific space equipment to specific individuals.

Log Maintenance and Events

The present invention can be used to log maintenance and events for space equipment.

Track the Life of an Item of Space Equipment

The present invention can be used to track a variety of events for space equipment.

Presenting Information in a Variety of Mediums

The present invention can be used to provide information in a variety of mediums including documents, checklists, pictures, diagrams, audio and/or video.

Problem Solving

The present invention can be used to provide the ability for problem solving via knowledge bases that can be associated with space equipment and individuals.

The present invention is effective, allowing for multiple sources of identification and providing helpful information to streamline the work that needs to be done.

Suitable for an Extraterrestrial Environment

The present invention is functional in an extraterrestrial environment.

Use for Space Equipment

The present invention has useful applications specifically for space equipment and its special use and maintenance needs.

CONCLUSION, RAMIFICATION, AND SCOPE

Accordingly, the reader will see that the improved, universal, role and discipline based, low cost means and method of space equipment identification, tracking and control are easy to use, quicker and accurate and can be used with space equipment or individuals to provide up-to-date pertinent information using methods such as on screen instructions, checklists, videos, pictures, diagrams, etc. or any combination thereof.

While the above descriptions contain several specifics these should not be construed as limitations on the scope of the invention, but rather as examples of some of the preferred embodiments thereof. Many other variations are possible. The variations could be used without departing from the scope and spirit of the novel features of the present invention.

Accordingly, the scope of the invention should be determined not by the illustrated embodiments, but by the appended claims and their legal equivalents.

We claim:

1. A system for use by a space exploration organization for space equipment recognition and control, the system comprising:
    a) a plurality of handheld devices configured to be used by a plurality of persons, and
    b) a database configured to communicate with the plurality of handheld devices,
    wherein each handheld device comprises:
        i) a camera configured to scan an image of an item of space equipment,
        ii) a display for displaying information, and iii) a wireless network connection to the database for sending outgoing database information to the database and for receiving incoming database information from the database, wherein the system is further configured to recognize the item of space equipment by interpreting a coded label, wherein the handheld device is further configured to identify a person using the handheld device, by scanning one of a face, an iris, a fingerprint, or a scan label of the person, wherein the database is configured to store data relating to the item of space equipment, the handheld devices, and the plurality of persons, wherein the database data includes role information for the person based on the item of space equipment, wherein the role is one of the group of maintenance, use, and observation, wherein the database contains item specific instructions for each role, wherein the item specific instructions comprise one or more of the group of:
i) checklist,
ii) pictures,
iii) audio, and
iv) video;

whereby when a first one of the plurality of handheld devices scans the item of space equipment, the system recognizes the item of space equipment and determines the role of the person, the database sends the item specific instructions to the first handheld device, the item specific instructions are displayed on the first handheld device, and the database records data about space equipment recognized, the first handheld device, and the person.

2. The system of claim 1, wherein the role of the person is maintenance,
wherein the item specific instructions include a list of parts and tools required, if any, and at least one video showing the maintenance steps.

3. The system of claim 1, wherein the role of the person is use,
wherein the item specific instructions include at least one video showing how to perform a task using the item of space equipment.

4. The system of claim 1, wherein the role of the person is observer,
wherein the observer is notified of the start of maintenance or use of the item of space equipment by another person.

5. A system for use by a space exploration organization for space equipment recognition and control, the system comprising:
a) a plurality of handheld devices configured to be used by a plurality of persons, and
b) a database configured to communicate with the plurality of handheld devices,
wherein each handheld device comprises:
i) a camera configured to scan an image of an item of space equipment,
ii) a display for displaying information, and
iii) a wireless network connection to the database for sending outgoing database information to the database and for receiving incoming database information from the database,
wherein the database is configured to store data relating to space equipment, the handheld devices, and the plurality of persons, whereby when a first one of the plurality of handheld devices scans the space equipment, the system recognizes the space equipment, the database sends item specific instructions to the first handheld device, the item specific instructions are displayed on the first handheld device, and the database records data about space equipment recognized and the first handheld device.

6. The system of claim 5 wherein the system is further configured to recognize the space equipment by interpreting a coded label.

7. The system of claim 5 wherein the handheld device is further configured to identify a person using the handheld device.

8. The system of claim 7 wherein the person is identified by scanning a scan label associated with the person.

9. The system of claim 7 wherein the person is identified by scanning one of a face, an iris, or a fingerprint.

10. The system of claim 7 wherein the database is configured to maintain role information for the person based on the item of space equipment, wherein the role is one of the group of maintenance, use, and observation.

11. The system of claim 10 wherein the item specific instructions are based on the role of the person.

12. The system of claim 10 wherein the item specific instructions comprise one or more of the group of:
i) checklist,
ii) pictures,
iii) audio, and
iv) video.

13. The system of claim 7 wherein the database is configured to maintain role information for the person based on the item of space equipment,
wherein the role of the person is maintenance,
wherein the item specific instructions include a list of parts and tools required, if any, and at least one video showing the maintenance steps.

14. The system of claim 7 wherein the database is configured to maintain role information for the person based on the item of space equipment,
wherein the role of the person is use,
wherein the item specific instructions include at least one video showing how to perform a task using the item of space equipment.

15. The system of claim 7 wherein the database is configured to maintain role information for the person based on the item of space equipment,
wherein the role of the person is observer,
wherein the observer is notified of the start of maintenance or use of the item of space equipment by another person.

16. A handheld device for use by a space exploration organization for space equipment recognition and control to be operated by a person having a predetermined role, the handheld device comprising:
a) a camera configured to scan an image of an item of space equipment,
b) a display for displaying information, and
c) a wireless network connection, configured to communicate to a database, for sending outgoing database information to the database and for receiving incoming database information from the database,
wherein the handheld device interacts with the database to recognize the item of space equipment,
wherein the handheld device identifies the person using the handheld device,
wherein the predetermined role is one of the group of maintenance, use, and observation, wherein the handheld device sends and receives data relating to the item of space equipment, the handheld device, and the person, wherein the data received contains item specific instructions for the predetermined role, wherein the item specific instructions comprise one or more of the group of:
  i) checklist,
  ii) pictures,
  iii) audio, and
  iv) video;

whereby the item specific instructions are displayed on the display.

17. A method for use by a space exploration organization for space equipment recognition and control using the handheld device of claim 16, the method comprising the steps of:
  a) capturing an image with the camera,
  b) interpreting the image,
  c) determining an item of space equipment,
  d) determining an identity of the person,
  e) determining if the person is authorized for the item of space equipment,
  f) if not authorized, indicating no authorized access,
  g) otherwise, based on the predetermined role of the person allowing and tracking one or more of the group of:
    i) performing maintenance,
    ii) performing use, and
    iii) performing observation.

18. The method for space equipment recognition and control of claim 17 further comprising steps for performing maintenance of the item of space equipment:
  a) identifying a part associated with the maintenance of the item of space equipment,
  b) identifying zero or more tools that may be required for the current part,
  c) displaying item specific instructions for the current maintenance task,
  d) confirming completion of the current maintenance task associated with the part,
  e) sending completion information to the database for recording in the database,
  f) if more tasks are required, performing steps a) through e) for each remaining maintenance task.

19. The method for space equipment recognition and control of claim 17 further comprising steps for performing use of the item of space equipment:
  a) if tools are required for the use of the item of space equipment, identifying one or more tools,
  b) providing item specific instructions for use of the item of space equipment,
  c) confirming completion of the current use task,
  d) sending completion information to the database for recording in the database,
  e) if more tasks are required, performing steps a) through d) for each remaining use task.

20. The method for space equipment recognition and control of claim 17 further comprising steps for performing observation of the item of space equipment:
  a) if instruction is needed, providing item specific instructions,
  b) sending observation start information to the database for recording in the database,
  c) sending observation finish information to the database for recording in the database,
  d) if more tasks are required, performing steps a) through c) for each remaining observation task.

* * * * *